US012617029B2

(12) United States Patent
Kress

(10) Patent No.: US 12,617,029 B2
(45) Date of Patent: May 5, 2026

(54) METHOD FOR DETERMINING A WORKING DEPTH OF A TOOL AND TOOL FOR MACHINING A WORKPIECE

(71) Applicant: MAPAL FABRIK FÜR PRÄZISIONSWERKZEUGE DR. KRESS KG, Aalen (DE)

(72) Inventor: Jochen Kress, Aalen (DE)

(73) Assignee: MAPAL FABRIK FÜR PRÄZISIONSWERKZEUGE DR. KRESS KG, Aalen (DE)

( * ) Notice: Subject to any disclaimer, the term of this patent is extended or adjusted under 35 U.S.C. 154(b) by 532 days.

(21) Appl. No.: 18/039,508

(22) PCT Filed: Dec. 2, 2021

(86) PCT No.: PCT/EP2021/084027
§ 371 (c)(1),
(2) Date: May 31, 2023

(87) PCT Pub. No.: WO2022/117752
PCT Pub. Date: Jun. 9, 2022

(65) Prior Publication Data
US 2024/0091865 A1 Mar. 21, 2024

(30) Foreign Application Priority Data
Dec. 4, 2020 (EP) .................................... 20211983

(51) Int. Cl.
*B23B 49/00* (2006.01)

(52) U.S. Cl.
CPC .......... *B23B 49/00* (2013.01); *B23B 2270/48* (2013.01)

(58) Field of Classification Search
CPC ... B23B 49/00; B23B 49/005; B23B 2270/48; B23B 51/104; B23C 2255/12
See application file for complete search history.

(56) References Cited

U.S. PATENT DOCUMENTS 5,882,151 A * 3/1999 Wirth, Jr. .............. B23B 49/005
408/202
10,213,843 B2 * 2/2019 Rebholz ................ B23B 51/104
(Continued)

FOREIGN PATENT DOCUMENTS

CN 105312626 A * 2/2016 ............. B23B 49/02
CN 107717016 A * 2/2018 ........... B23B 51/104
(Continued)

OTHER PUBLICATIONS

International Search Report and Written Opinion issued in corresponding International Application No. PCT/EP2021/084027, dated Mar. 24, 2022, pp. 1-11.
(Continued)

*Primary Examiner* — Bayan Salone
(74) *Attorney, Agent, or Firm* — Carter, DeLuca & Farrell LLP; George Likourezos

(57) ABSTRACT

The invention relates to a method for determining a working depth of a tool. The method includes arranging a tool and a depth determination device on a depth setting device; and applying a predetermined compression force in axial direction to the depth determination device, such that at least a part of the depth determination device is elastically compressed by a certain compression amount against a contact surface, obtaining a compressed state of the depth determination device. The method further includes securing a mounting device to a clamping region of a shaft of the tool in the compressed state of the depth determination device such that the mounting device is firmly mounted to the clamping region, whereby a tool assembly is formed; releasing the compression force from the depth determination device, and removing the tool assembly from the depth setting device.

21 Claims, 8 Drawing Sheets

(56) References Cited

U.S. PATENT DOCUMENTS

| | | | | |
|---|---|---|---|---|
| 10,507,534 | B2 * | 12/2019 | Ohana .................... | G01C 15/04 |
| 10,632,546 | B2 * | 4/2020 | von Puttkamer ..... | B23B 51/107 |
| 2007/0099150 | A1 * | 5/2007 | Muller .................... | A61C 3/02 |
| | | | | 433/165 |
| 2017/0266736 | A1 | 9/2017 | Ohana | |
| 2017/0274459 | A1 | 9/2017 | Rebholz | |
| 2019/0030624 | A1 * | 1/2019 | von Puttkamer ...... | B23D 77/00 |
| 2021/0146452 | A1 * | 5/2021 | Rebholz ................ | B23B 49/005 |

FOREIGN PATENT DOCUMENTS

| | | | | | |
|---|---|---|---|---|---|
| CN | 111246810 | A | * | 6/2020 | .......... A61B 17/162 |
| CN | 211464928 | U | * | 9/2020 | |
| CN | 111922764 | A | * | 11/2020 | .............. B23Q 5/04 |
| DE | 102008022968 | A1 | * | 8/2009 | ............. B23B 1/104 |
| DE | 102014212147 | A1 | * | 12/2015 | ............. B23B 45/00 |
| EP | 2093001 | A1 | * | 8/2009 | ........... B23B 49/005 |
| EP | 2386373 | A2 | * | 11/2011 | ............. B25D 17/02 |
| EP | 3033194 | B1 | * | 6/2017 | .............. B23C 9/00 |
| FR | 2484880 | A1 | * | 12/1981 | ............. B23B 49/06 |
| FR | 2870595 | A1 | * | 11/2005 | .......... B23Q 15/007 |
| JP | 61127913 | U | | 1/1985 | |
| JP | 2003062713 | A | * | 3/2003 | .............. B23C 5/10 |
| JP | 2003340621 | A | * | 12/2003 | |
| JP | 2010207999 | A | * | 9/2010 | .............. B23C 5/10 |
| JP | 2020142421 | A | * | 9/2020 | |
| WO | WO-2019035096 | A1 | * | 2/2019 | ........ A61B 17/1631 |
| WO | WO-2019211364 | A1 | * | 11/2019 | .......... B23B 51/104 |

OTHER PUBLICATIONS

European Search Report issued in corresponding EP Patent Application No. EP20211983, dated May 11, 2021, pp. 1-2.

Japanese Office Action issued by the Japanese Patent Office in connection with International Application No. 2023-533839, dated Mar. 6, 2025. English Translation.

Chinese Office Action issued by the China National Intellectual Property Administration in connection with International Application No. 202180081638.0, dated Jul. 24, 2025.

European Office Action issued by the European Patent Office in connection with International Application No. 20211983.0, dated Aug. 26, 2024.

Chinese Decision to Grant issued by the China National Intellectual Property Administration in connection with International Application No. 202180081638.0, dated Dec. 9, 2025.

* cited by examiner

METHOD FOR DETERMINING A WORKING DEPTH OF A TOOL AND TOOL FOR MACHINING A WORKPIECE

CROSS-REFERENCE TO RELATED APPLICATIONS

The application corresponds to PCT/EP2021/084027, filed Dec. 2, 2021, entitled "METHOD FOR DETERMINING A WORKING DEPTH OF A TOOL AND TOOL FOR MACHINING A WORKPIECE", which claims priority to EP20211983.0, filed Dec. 4, 2020, the entirety of both are incorporated herein by reference.

FIELD OF THE INVENTION

The invention is related to a method for determining a working depth of a tool, a tool for machining a workpiece, a depth determination device, a tool assembly, and a method for using such tool assembly.

A respective tool assembly is known for example from EP 3 033 194 B1. Such a tool assembly is used in particular with a handheld tool drive in order to manually perform a specific operation in a region of a bore, in particular at a skin of an aircraft part, like, e.g., a chamfering, countersinking, spot facing, or deburring operation. Such operation is carried out in order to remove paint from the surface of the respective aircraft part such that a fastener like a bolt or screw may contact the metallic structure beneath the paint and thus be electrically grounded. This type of operation must be accomplished in a reproducible manner and with an axial precision of approximately 10 μm to 20 μm, irrespective of the actual person performing the operation. Therefor the tool assembly has a depth determination device for objectively determining the cutting depth of the tool by providing a stop surface which acts as a limit stop in well-defined axial position relative to a cutting edge of the tool. The tool assembly known from EP 3 033 194 B1 has a relatively complicated structure and therefore is expensive. Further, it needs a cumbersome and elaborate method to determine the working depth of the tool, i.e. to set the relative axial position of the stop surface with respect to the cutting edge.

It is therefore an object of the invention to provide a method for determining a working depth of a tool, a tool for machining a workpiece, a depth determination device, a tool assembly, and a method for using such tool assembly, which is relatively cheap and easy to handle, in particular when it becomes necessary to change the tool, e.g. because of wear and tear of the cutting edge.

This object is achieved by providing the present technical teachings, in particular the teachings of the independent claims as well as the teachings of the dependent claims and the preferred embodiments disclosed in the description.

The object is in particular achieved by providing a method for determining a working depth of a tool, the method comprising a) arranging a tool and a depth determination device on a depth setting device in such a way that a mounting device of the depth determination device is located at least partially around a clamping region of a shaft of the tool such that the depth determination device is free to move relative to the tool in an axial direction, and a stop surface of the depth determination device lies against a contact surface of the depth setting device, and a cutting edge of the tool lies against a limit stop of the depth setting device; b) securing the mounting device to the clamping region of the shaft such that the mounting device is firmly mounted to the clamping region of the shaft, whereby a tool assembly is formed; and c) removing the tool assembly from the depth setting device. Thus, a maximum working depth, which is a maximum cutting depth, of the tool is conveniently determined by an axial distance between the contact surface and the limit stop, because this axial distance determines the axial distance between the stop surface and the cutting edge. The depth setting device serves as a gauge for setting the cutting depth of the tool. By making use of the relatively simple depth setting device having the contact surface and the limit stop the cutting depth of the tool assembly can be set in an easier, faster and cheaper manner than it is the case with known tool assemblies and respective methods. Further, since the cutting depth is precisely and reliably determined by the depth setting device, the depth determination device itself needs not to have any adjusting device for adjusting the axial distance between the stop surface and the cutting edge. Thus, the depth determination device and the tool assembly may be simple in structure and construction as well as inexpensive.

Preferably, the mounting device is secured in step b) to the clamping region of the shaft, thereby firmly attaching the mounting device to the clamping region of the shaft such as to prevent any further axial movement of the depth determination device relative to the tool. There may be parts of the depth determination device, however, which preferably are free to axially move relative to the tool between a distal stop, preferably provided by a tool head of the tool, in particular a shoulder of the tool head, or some retaining device like a retaining ring, and a proximal stop, provided by the depth determination device, as long as the tool does not engage a workpiece. When the tool engages a workpiece, the mounting device hinders further relative axial movement of these parts in proximal direction, i.e. in a direction away from the workpiece beyond the position of the mounting device. The distal stop preferably prevents these parts from falling off the tool.

The depth setting device has the contact surface which preferably is adapted such that the stop surface of the depth determination device may lie against the contact surface, and further the depth setting device has the limit stop which is adapted such that the cutting edge of the tool may lie against the limit stop.

The limit stop preferably has a shape which is complementary to an imaginary surface obtained by rotating the cutting edge about a tool axis.

The tool axis is in particular a longitudinal axis, or symmetry axis, or axis of rotation of the tool. An axial direction preferably is a direction parallel to or coinciding with the tool axis. A circumferential direction is a direction which encompasses the tool axis, i.e. which is circumferential with respect to the tool axis. A radial direction is orthogonal to the tool axis.

The working depth or cutting depth has a positive sign when the cutting edge is offset from the stop surface in a direction away from the shaft and towards an imaginary workpiece to be machined in the future. In this case, the cutting edge will cut into a machined surface of a workpiece until the stop surface will rest or be pressed against the machined surface. Accordingly, in order to set a positive working depth, the limit stop is offset relative to the contact surface in the direction away from the shaft. However, the working depth or cutting depth may also have a negative sign when the cutting edge is offset from the stop surface in a direction towards the shaft and away from the imaginary workpiece. In this case, the cutting edge will cut above the surface of the workpiece up to the point when the stop surface will rest or be pressed against the surface of the workpiece, in particular for removing a burr. Accordingly, in order to set a negative working depth, the limit stop is offset relative to the contact surface in the direction towards the shaft.

In particular, prior to securing the mounting device in step b), in a step b0) a predetermined compression force in axial direction is applied to the depth determination device, such that at least a part of the depth determination device is elastically compressed by a certain compression amount against the contact surface. Then, prior to removing the tool assembly from the depth setting device in step c), in a step c0) the compression force is released from the depth determination device. In this way, the cutting depth can be changed from the maximum cutting depth to another value determined by the compression force, such that different cutting depths can be chosen in an easy, inexpensive, reliable and reproducible manner.

In particular, the fundamental functionality of the method is as follows: Before the compression force in step b0) is applied, the cutting edge lies against the limit stop, and the stop surface lies against the contact surface, but the mounting device is free to axially move relative to the tool shaft. When the compression force is applied in step b0), the depth determination device is partially compressed, and the mounting device is axially displaced relative to the tool shaft, wherein the actual displacement depends on the compression force. In the compressed state, while the compression force is still applied, then the mounting device is firmly secured to the clamping region of the tool shaft in step b), and only afterwards the compression force is released in step c0). While the depth determination device relaxes elastically by the compression amount from the compressed state, the tool, firmly coupled to the mounting device, is lifted by the same compression amount, and the cutting edge is withdrawn from the limit stop, wherein the final distance of the cutting edge from the limit stop is also defined by the compression amount. At the same time, the stop surface still rests on the contact surface. Thus, the axial position of the cutting edge relative to the stop surface is changed in dependence of the applied compression force. This means that the cutting depth of the tool assembly is set in a reliable and easy manner by applying a well-defined, predetermined compression force in step b0). In particular, in this way working depth of cutting depth is lowered relative to the maximum cutting depth, irrespective of whether the cutting depth has a positive sign or a negative sign, because by first compressing the depth determination device, then securing the mounting device, and afterwards releasing the compression force, the cutting edge is shifted relative to the stop surface in the direction of the shaft. Thus, the value of the cutting depth initially defined by the distance of the contact surface and the limit stop will become smaller; in particular, the amount of the value will decrease when the sign is positive, and the amount of the value will increase when the sign is negative.

In particular, the compression amount by which the depth determination device is elastically compressed depends on or is determined by the predetermined compression force.

Preferably, the elasticity of the depth determination device is higher than the elasticity of the depth setting device, or, in other words, the depth setting device at least in the region of the contact surface is more rigid than the depth determination device. Most preferably, when the compression force is applied, only the depth determination device is compressed, and the depth setting device—in the region of the contact surface—is not compressed. Preferably, the depth setting device is—at least in the region of the contact surface—made of steel, and the depth determination device is made of aluminium.

In a preferred embodiment, the compression amount by which the depth determination device shall be elastically compressed is defined prior to step b0), and the compression force is set as a function of the defined compression amount. In particular, since the compression amount defines the change in the working depth and even may be identical to the working depth, the working depth is defined first, and then the compression amount is defined in accordance with the working depth. The compression force is in particular calculated as a function of the defined compression amount. Preferably, the compression force is a linear function of the compression amount, or, vice versa, the compression amount is a linear function of the compression force. Alternatively, the compression force is taken from a data set or from a lookup table depending from the defined compression amount. In particular, the data set or lookup table comprises values for the compression force assigned to corresponding values for the compression amount.

In a preferred embodiment, the contact surface is provided by the depth setting device in one piece. Thus, the contact surface is provided in a most simple and well-defined way at the depth setting device.

Alternatively, the contact surface is provided by a contact distance element arranged on the depth setting device. Then, preferably, the contact distance element, in particular a height of the contact distance element, defines the maximum cutting depth and thus the maximum working depth for the tool. Different maximum working depths can be defined simply by choosing different contact distance elements, in particular having different heights. Thus, the working depth can be adjusted in a simple and cost-efficient way just by changing the contact distance element without the need to use a different depth setting device, and further the working depth might be adjusted even without having to apply the compression force. In particular, by providing the contact distance element, a positive working depth may be defined.

Preferably, the contact distance element is a distance ring, most preferably a precision foil. Preferably, the contact distance element comprises steel or is made of steel, most preferably, the contact distance element consists of steel. Preferably, the contact distance element has a height of 0.1 mm.

In a preferred embodiment, the limit stop is provided by the depth setting device in one piece, in particular by a depth set depression—for a positive cutting depth —, or by a depth set elevation—for a negative cutting depth. In this way, the limit stop is provided in a most simple and well-defined way at the depth setting device. In particular, preferably a depth of the depth set depression, or a height of the depth set elevation, defines the maximum cutting depth and thus the maximum working depth of the tool.

Alternatively, the limit stop is provided by a stop distance element arranged on the depth setting device. Then, preferably, the stop distance element, in particular a height of the stop distance element, defines the maximum cutting depth and thus the maximum working depth for the tool. Different maximum working depths can be defined simply by choosing different stop distance elements, in particular having different heights. Thus, the working depth can be adjusted in a simple and cost-efficient way just by changing the stop distance element without the need to use a different depth setting device, and further the working depth might be adjusted even without having to apply the compression force. In particular, by providing the stop distance element, a negative working depth may be defined.

In a preferred embodiment, the compression force is applied by a pressure screw, or pneumatically, or hydraulically. In this way, the compression force may be applied in a simple, reliable, reproducible and cost-efficient way.

Alternatively, or additionally, the compression force is preferably applied to the mounting device, in particular as a part of the depth determination device. Alternatively, the compression force is applied to another part of the depth determination device, preferably to a cutting cage thereof. Applying the compression force to the mounting device reliably guarantees that the mounting device is shifted relative to the tool shaft on application of the compression force, in particular by the compression amount. However, the mounting device may also be shifted relative to the tool shaft when the compression force is applied to another part of the depth determination device, e.g. because the mounting device is effectively coupled to this other part and accordingly moves together with the other part, or the mounting device is urged downwards onto the other part by gravitational force.

In a preferred embodiment, a drilling tool, a milling tool, a chamfering tool, a countersinking tool, a spot facing tool, or a deburring tool is used as the tool. The advantages as explained above are especially achieved with respect to such a tool.

The object is also achieved by providing a tool for machining a workpiece, wherein preferably the tool is adapted to be used in a method according to the invention, or in a method according to at least one of the preferred embodiments as described above. The tool comprises a tool head with at least one cutting edge. The tool further comprises a shaft, wherein the shaft comprises a clamping region with a friction enhanced surface. With respect to the tool, preferably the same advantages are achieved which are explained above in relation to the method for determining the working depth.

That the clamping region has a friction enhanced surface in particular means that friction in the clamping region, in particular at the friction enhanced surface, is higher than it is in other surface regions of the shaft, the other regions being not part of the friction enhanced surface, in particular not part of the clamping region.

In a preferred embodiment, the friction enhanced surface comprises a plurality of depressions or a knurled surface. The depressions or the knurled surface are preferably milled or ground into the clamping region. Milling and grinding are most preferred methods for producing the friction enhanced surface in relatively hard materials such as cemented carbide, polycrystalline diamond (PCD), or high-speed steel (HSS). The tool preferably comprises a material selected from a group consisting of cemented carbide, polycrystalline diamond (PCD), and high-speed steel. Preferably, the tool consists of or is made of a material selected from this group.

In a preferred embodiment, the plurality of depressions includes a plurality of circumferential grooves. The grooves preferably have a sawtooth profile. In particular, the plurality of depressions is a plurality of circumferential grooves, in particular having a sawtooth profile. A plurality of circumferential grooves as the plurality of depressions is both simple and cost-efficient to produce and highly apt to enhance friction in the clamping region.

In a preferred embodiment, the tool head comprises an insertion pin for guiding the tool in a depression of a workpiece to be machined by the tool. The insertion pin is preferably made of plastic, in particular PEEK, or a composite material. Preferably, the insertion pin is attached to the tool head. In this way, the tool may be precisely guided by the insertion pin, which for itself is lightweight, has a soft surface so as not to damage the surface of a bore machined with the tool, and is cheap in production.

In a preferred embodiment, the tool is selected from a group consisting of a drilling tool, a milling tool, a chamfering tool, a countersinking tool, a spot facing tool, and a deburring tool. The advantages as explained above are especially achieved with respect to such a tool.

In a preferred embodiment, the tool is adapted to cooperate with a depth determination device according to the invention, or with a depth determination device in accordance with at least one of the preferred embodiments described below.

The object is also achieved by providing a depth determination device, wherein the depth determination device comprises a cutting cage adapted to at least partially enclose a tool head of a tool, in particular according to the invention or according to at least one of the embodiments as disclosed above. The depth determination device further comprises a circumferential bearing device which is arranged at least partially in the cutting cage. The circumferential bearing device is adapted to allow for a relative rotational movement between the cutting cage and the tool. The depth determination device further comprises a mounting device which is adapted to be firmly mounted to the tool in a clamping region of the tool. The cutting cage has a stop surface adapted to determine a cutting depth, i.e. the working depth, of the tool when the depth determination device is attached to the tool. With respect to the depth determination device, preferably the same advantages are achieved which are explained above in relation to the method and the tool.

In particular, the cutting cage encloses the tool head in circumferential direction, and preferably at least partially in axial direction.

In a preferred embodiment, the depth determination device further comprises an axial bearing device arranged between the cutting cage and the mounting device. The axial bearing device is adapted to allow for a relative rotational movement between the cutting cage and the mounting device. In this way, wear and tear due to a relative rotation between the cutting cage and the mounting device is most efficiently and conveniently reduced.

In a preferred embodiment, the circumferential bearing device is a slide bearing, in particular a bearing sleeve, preferably made of copper or a composite material. In this case, the circumferential bearing device may have a simple structure and is relatively simple and inexpensive to produce.

Alternatively, or additionally, the axial bearing device is a roller bearing, in particular an axial ball bearing. In this case, the axial bearing device is particularly reliable and has a long life and low maintenance due to minimum friction. Alternatively, the axial bearing device is a slide bearing, in particular a bearing ring, preferably a copper ring or a composite ring.

In a preferred embodiment, the mounting device comprises a clamping ring. This in particular is a simple, inexpensive and highly reliable embodiment of the mounting device.

Preferably, the clamping ring has two ring ends spaced from each other in circumferential direction by a circumferential gap, wherein a first ring end of the two ring ends has a through hole, and a second ring end of the two ring ends has a thread, such that a clamping screw may reach through the through hole and engage the thread for bringing the ring ends closer together and thus closing the circumferential gap when the screw is tightened in the thread.

Preferably, the mounting device comprises the clamping ring and a screw, the screw reaching through the through hole and engaging with the thread.

In a preferred embodiment, the depth determination device has no adjusting device for adjusting an axial distance between the stop surface and a cutting edge of the tool. Instead, in order to define the working depth, the depth determination device only comprises the mounting device as a fixation means, in particular clamping means. There is no need for the depth determination device to have an adjusting device because the working depth or cutting depth of the tool is preferably set in accordance with the inventive method or at least one embodiment of the method as disclosed above. Thus, the depth determination device may have a simple structure and be easily and inexpensively produced.

In a preferred embodiment, the cutting cage has a plurality of radial chip openings. When machining a surface of a workpiece with the tool, chips produced by the tool may be conveyed away from an actual working site in radial direction through the chip openings.

The object is also achieved by providing a tool assembly, wherein the tool assembly comprises a depth determination device according to the invention or according to at least one of the embodiments as disclosed above, and a tool, in particular a tool according to the invention or according to at least one of the embodiments as disclosed above. The mounting device is firmly secured to the clamping region of the tool. With respect to the tool assembly, preferably the same advantages are achieved as explained above in relation to the method, the tool, and the depth determination device.

In a preferred embodiment, the tool assembly is adapted to be coupled to a handheld tool drive, in particular a pneumatical gun drill. The advantages as explained above are especially achieved in relation to a handheld tool drive.

The object is also achieved by providing a method for using the tool assembly according to the invention or according to at least one of the embodiments as disclosed above, wherein the tool assembly is used to machine a surface of an aircraft. The advantages as explained above are especially achieved when the tool assembly is used for machining aircraft surfaces.

According to another aspect of the invention, a depth setting device is provided, the depth setting device having a contact surface adapted such that a stop surface of a depth determination device may lie against the contact surface, the depth setting device further comprising a limit stop adapted such that a cutting edge of a tool may lie against the limit stop. The contact surface and the limit stop are arranged relative to each other such as to define a maximum working depth of a tool. With respect to the depth setting device, the same advantages are achieved which are explained above in relation to the method, the tool, the depth determination device, and the tool assembly.

Preferably, the depth setting device has a pressure device adapted to apply a predetermined pressure force to a depth determination device the stop surface of which is resting against the contact surface.

Preferably, the depth setting device has a control, the control being adapted to determine the predetermined pressure force depending from a pre-set working depth. The control may have input means, e.g. a keyboard, a voice recognition system, a touchpad or other input sensitive surface or control panel, such that the present working depth may be entered by a worker. Preferably, the control is adapted to calculate the predetermined pressure force as a function of the pre-set working depth. In the alternative, the control may be adapted to select the predetermined pressure force from a data set or lookup table depending from the pre-set working depth. Preferably, the control is connected to the pressure device in order to cause the pressure device to apply the predetermined pressure force.

The depth setting device preferably comprises at least one feature which is implicitly disclosed above in relation to the method.

In a preferred embodiment, the contact surface is provided by the depth setting device in one piece. Thus, the contact surface is provided in a most simple and well-defined way at the depth setting device.

Alternatively, the contact surface is provided by a contact distance element arranged on the depth setting device. In particular, by providing the contact distance element, a positive working depth may be defined. Preferably, the contact distance element is a distance ring, most preferably a precision foil. Preferably, the contact distance element comprises steel or is made of steel, most preferably, the contact distance element consists of steel. Preferably, the contact distance element has a height of 0.1 mm. In a preferred embodiment, the limit stop is provided by the depth setting device in one piece, in particular by a depth set depression—for a positive cutting depth—, or by a depth set elevation—for a negative cutting depth. In this way, the limit stop is provided in a most simple and well-defined way at the depth setting device. In particular, preferably a depth of the depth set depression, or a height of the depth set elevation, defines the maximum cutting depth and thus the maximum working depth of the tool.

Alternatively, the limit stop is provided by a stop distance element arranged on the depth setting device. In particular, by providing the stop distance element, a negative working depth may be defined.

The limit stop preferably has a shape which is complementary to an imaginery surface obtained by rotating a cutting edge of a tool to be used in relation to the depth setting device about a tool axis of the tool.

In a preferred embodiment, the pressure device comprises a pressure screw, or is embodied as a pneumatical or hydraulical pressure device.

BRIEF DESCRIPTION OF THE DRAWINGS

The invention is explained below in further detail with reference the drawing. In the drawing

DETAILED DESCRIPTION

Figure 1:
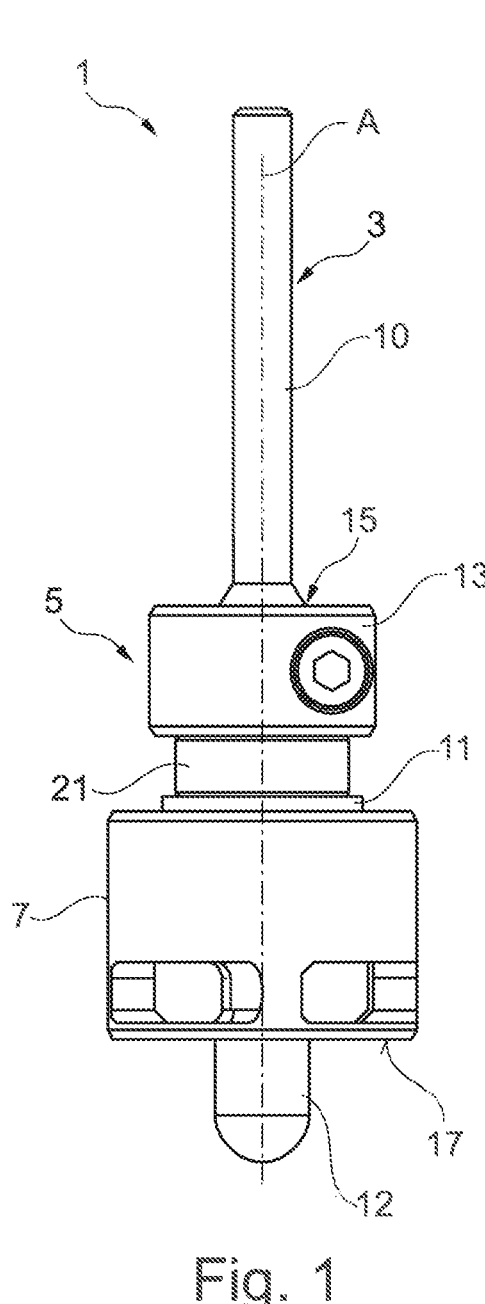
FIG. 1 shows a first embodiment of a tool assembly having a first embodiment of a depth determination device and a tool.

FIG. 1 shows a first embodiment of a tool assembly 1 comprising a tool 3 and a depth determination device 5. The depth determination device 5 has a cutting cage 7 which is adapted to at least partially enclose a tool head 9—shown in FIG. 3—in particular in circumferential and axial direction. The axial direction is a direction defined by an axis A which is a longitudinal axis both of the tool 3 and the tool assembly 1. Further, the axis A is an axis of relative rotation between the tool 3 and a workpiece when the tool 3 is used for machining the workpiece. The circumferential direction embraces the axis A coaxially. A radial direction is orthogonal to the axis A.

The tool assembly 1, in particular a shaft 10 of the tool 3, is preferably adapted to be coupled to a handheld tool drive, in particular pneumatical gun drill. Preferably, the tool assembly 1 is used to machine a surface of an aircraft.

The tool head 9 preferably comprises an insertion pin 12 which is adapted to guide the tool 3 in a depression or bore of a workpiece which is to be machined by the tool 3.

The depth determination device 5 comprises a circumferential bearing device 11 which is at least partially arranged in the cutting cage 7 and adapted to allow for a relative rotational movement between the cutting cage 7 and the tool 3. Further, the depth determination device 5 comprises a mounting device 13 which is adapted to be firmly mounted to the tool 3 in a clamping region 15 on the tool 3. In the state shown in FIG. 1, the mounting device 13 is firmly mounted onto the clamping region 15 of the tool 3.

The cutting cage 7 has a stop surface 17 which is adapted to determine a cutting depth of the tool 3 when the depth determination device 5 is attached to the tool 3. By mounting the mounting device 13 at a well-defined axial position onto the tool 3, a well-defined axial position relative to a cutting edge 19 of the tool 3—shown in FIG. 3—is defined for the stop surface 17 and thus the axial distance between the stop surface 17 and the cutting edge 19 defines the cutting depth and thus the working depth by which the cutting edge 19 may cut into a surface or above the surface of a workpiece machined by the tool 3. Thus, in order to define the working depth, the relative axial position of the mounting device 13 and the tool 3 shall be defined.

This is still true even if in some embodiments the cutting cage 7 may be allowed to freely move axially between a distal stop 20—see FIG. 3—and a proximal stop provided by the mounting device 13 as long as the tool 3 does not engage a workpiece. When the tool 3 engages a workpiece and reaches the final working depth, the mounting device 13 effectively limits any further proximal movement of the cutting cage 7—and thus the stop surface 17—beyond the position defined by the mounting device 13.

The invention in particular allows for a simple, cost-efficient, reliable and reproducible setting of the working depth.

In the first embodiment, the depth determination device 5 preferably further comprises an axial bearing device 21 which is arranged between the cutting cage 7 and the mounting device 13, and which is adapted to allow for a relative rotational movement between the cutting cage 7 and the mounting device 13.

Figure 2A:
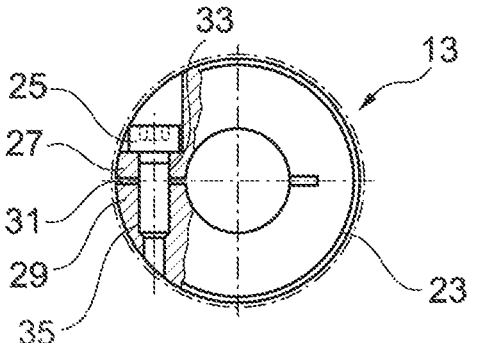
FIGS. 2*a-b* show an exploded view of the first embodiment of the depth determination device.
Figure 2B:
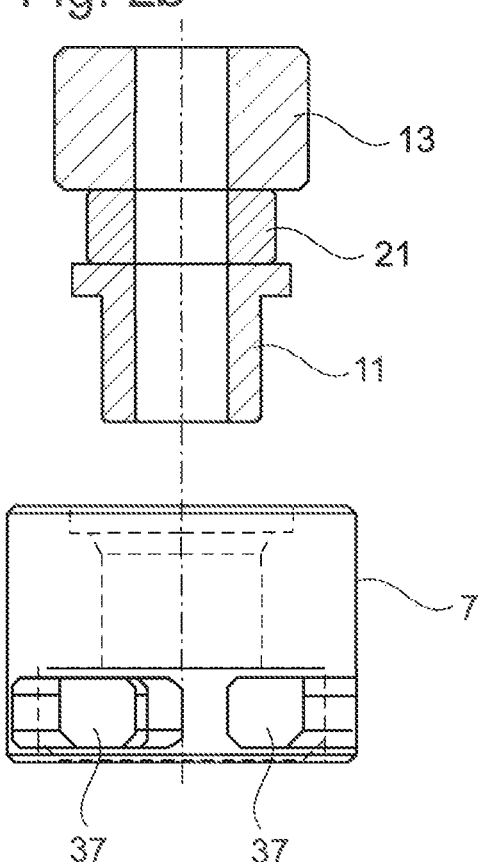

FIGS. 2a-b show an exploded view of the first embodiment of the depth determination device 5 according to FIG. 1. The same or functionally equivalent elements are assigned the same reference numerals in all figures, such that reference is made in each case to the preceding explanations.

In FIG. 2a the mounting device 13 is shown in a partly sectioned top view, from which it becomes clear that preferably the mounting device 13 comprises a clamping ring 23 and a clamping screw 25. The clamping ring 23 has two ring ends 27, 29 spaced from each other by a circumferential gap

31, wherein a first ring end 27 of the two ring ends 27, 29 has a through hole 33, and a second ring end 29 of the two ring ends 27,29 has a thread 35, such that the clamping screw 25 may reach through the through hole 33 and engage the thread 35 for bringing the ring ends 27, 29 closer together and thus closing the circumferential gap 31 when the clamping screw 25 is tightened.

In FIG. 2b the depth determination device 5 is shown in an exploded view. The circumferential bearing device 11 preferably is a slide bearing, in particular a bearing sleeve. The axial bearing device 21 preferably is a roller bearing, in particular an axial ball bearing. Alternatively, the axial bearing device 21 is a slide bearing, in particular a bearing ring, preferably a copper ring or a composite ring.

The cutting cage 7 comprises a plurality of radial chip openings 37.

The depth determination device 5 has no adjusting device for adjusting the axial distance between the stop surface 17 and the cutting edge 19. Rather, this axial distance is set in accordance with a method further described below.

Preferably, the cutting cage 7 is made of aluminium. Preferably, at least a portion of the tool head 9 comprising the cutting edge 19, preferably the tool head 9, preferably the tool 3, is made of high-speed steel; alternatively, polycrystalline diamond (PCD) may be used as a material; alternatively, cemented carbide may be used as a material. The mounting device 13, in particular the clamping ring 23, preferably is made of steel. Preferably, the axial bearing device 21 is made of steel. Preferably, the circumferential bearing device 11 is made of copper. The insertion pin 12 is preferably made of plastic, in particular PEEK, or a composite material.

Figure 3A:
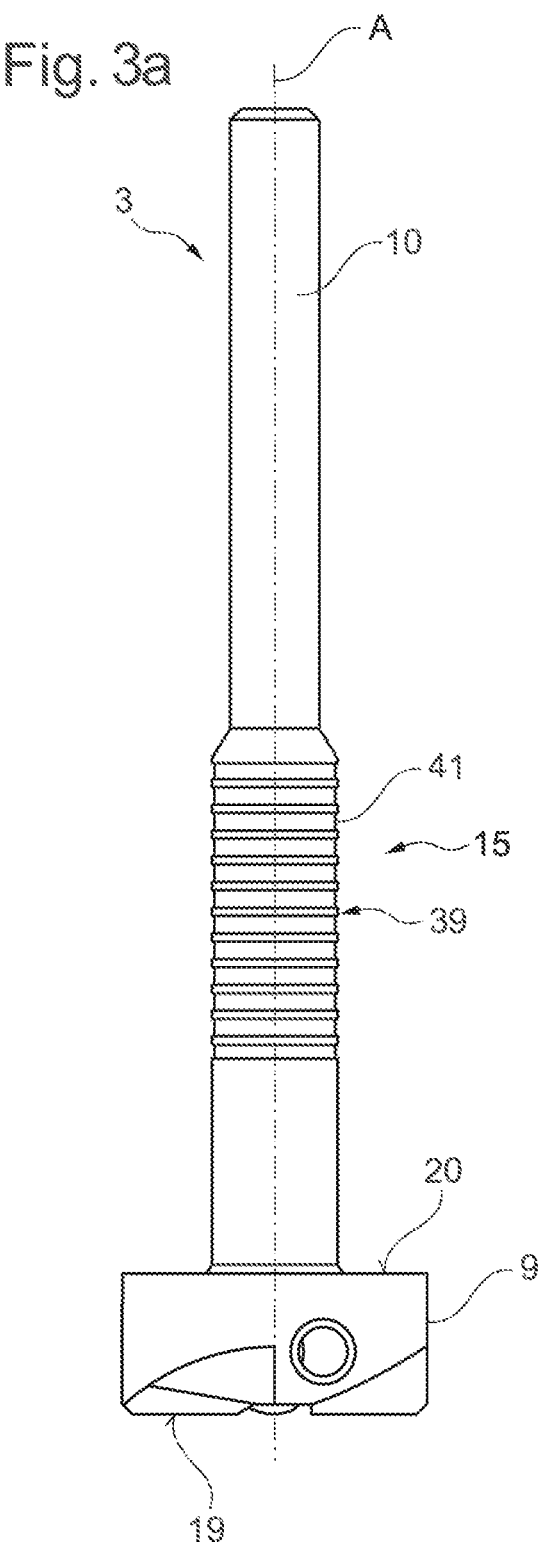
FIGS. 3*a-c* show the tool of the first embodiment of the tool assembly according to FIG. 1.
Figure 3B:
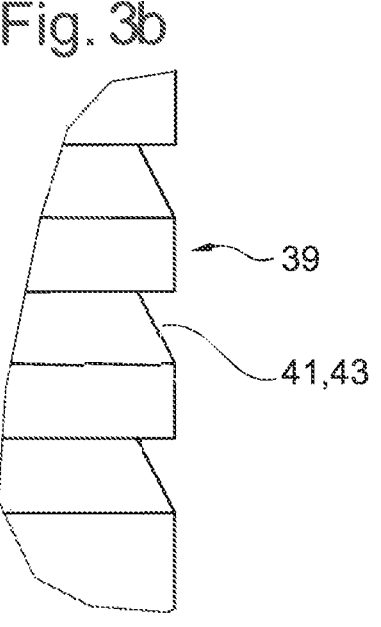
Figure 3C:
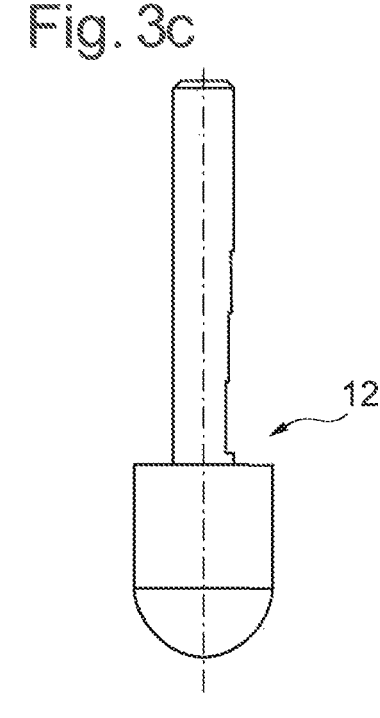

FIGS. 3a-c show the tool 3 of the first embodiment of the tool assembly 1 according to FIG. 1. In FIG. 3a the clamping region 15 comprises a friction enhanced surface 39. In particular, friction is higher in the clamping region 15, especially at the friction enhanced surface 39, than in other surface regions of the shaft 10.

Preferably, the friction enhanced surface 39 comprises a plurality of depressions 41, to only one of which a reference numeral is assigned for the sake of clearness. Alternatively, the friction enhanced surface 39 may comprise a knurled surface or be embodied as a knurled surface. Preferably, the depressions 41 or the knurled surface are milled or ground into the clamping region 15.

The tool 3 preferably is a drilling tool, a milling tool, a chamfering tool, a countersinking tool, a spot facing tool, or a deburring tool.

In FIG. 3b the friction enhanced surface 39 is shown in detail. Preferably, the plurality of depressions 41 includes—or preferably is—a plurality of circumferential grooves 43, the grooves 43 preferably having a sawtooth profile.

In FIG. 3c the insertion pin 12 is shown which preferably can be attached to the tool head 9.

Figure 4:
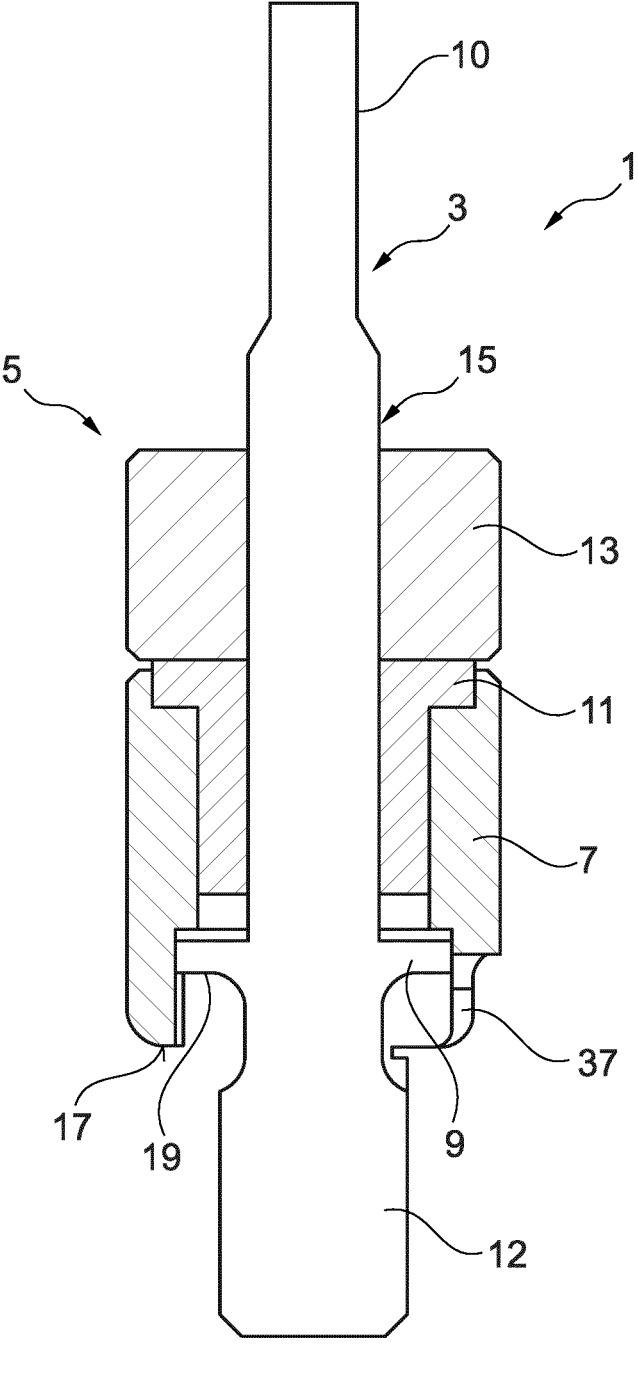
FIG. 4 shows a second embodiment of the tool assembly.

FIG. 4 shows a second embodiment of the tool assembly 1. This embodiment is different in particular in so far from the first embodiment of the tool assembly 3 as it does not comprise the axial bearing device 21. Instead, the mounting device 13 is in direct contact with the circumferential bearing device 11, such that the circumferential bearing device 11 not only allows for a relative rotation between the tool 3 and the cutting cage 7, but also directly for a rotational movement between the mounting device 13 firmly clamped onto the tool 3 and the cutting cage 7.

An embodiment of a method for determining a working depth of the tool 3 is explained with reference to FIGS. 5*a-c*, wherein FIG. 5 in particular shows a first embodiment of a depth setting device 45.

Figure 5A:
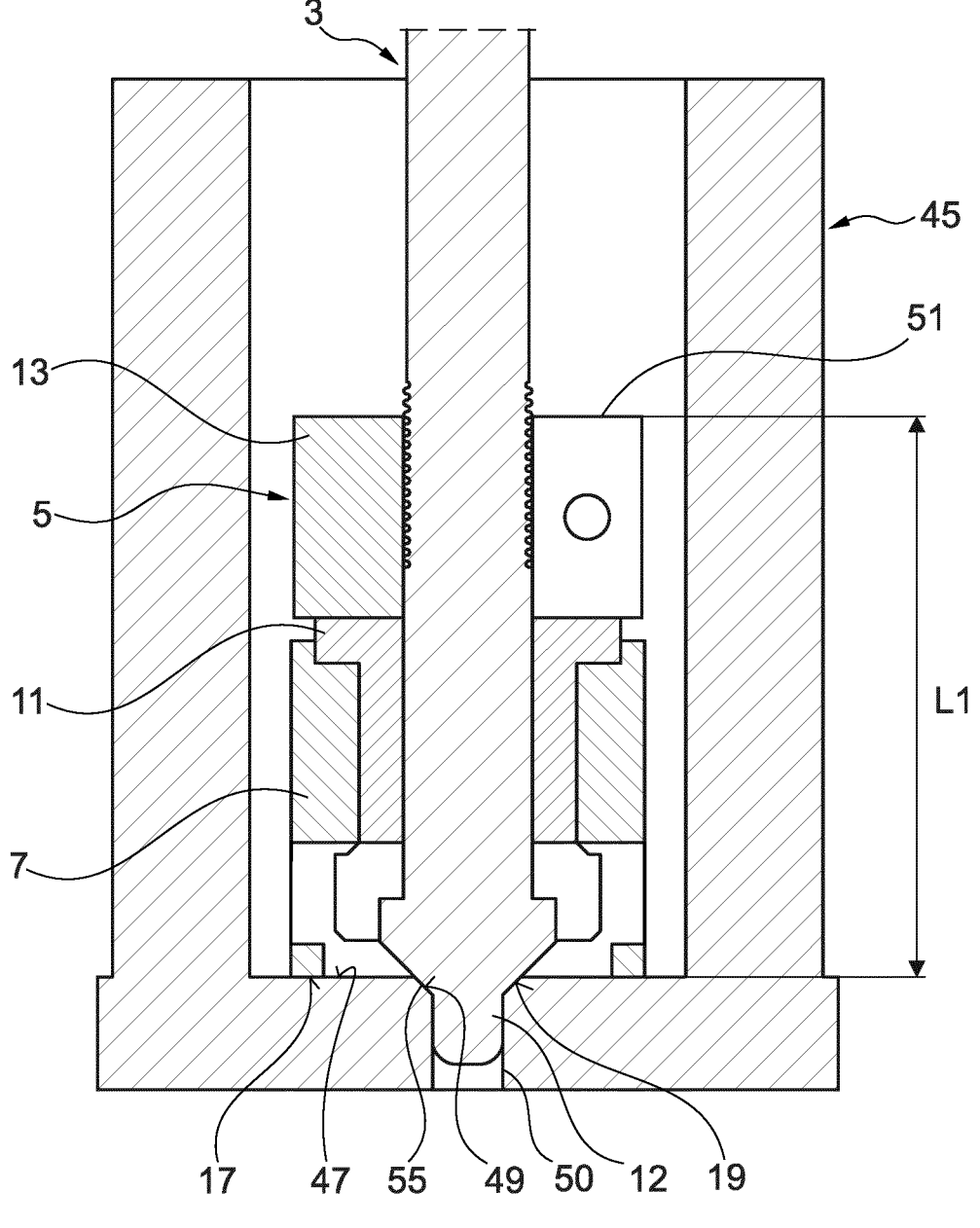
FIGS. 5*a-c* show an embodiment of a method for determining a working depth of a tool making use of a first embodiment of a depth setting device.

As shown in FIG. 5*a* a first step, the tool 3 and the depth determination device 5 are arranged on the depth setting device 45 in such a way that the mounting device 13 is located at least partially around the clamping region 15 such that the depth determination device 5 and in particular the mounting device 13 is still free to axially move relative to the tool 3. At the same time, the stop surface 17 lies against a contact surface 47 of the depth setting device 45, and the cutting edge 19 lies against a limit stop 49 of the depth setting device 45. Preferably, the insertion pin 12 is received in a receiving bore 50 of the depth setting device 45.

As long as no compression force is applied the depth determination device 5, a first distance between an upper end 51 of the depth determination device 5 and the contact surface 47 is L1.

Figure 5B:
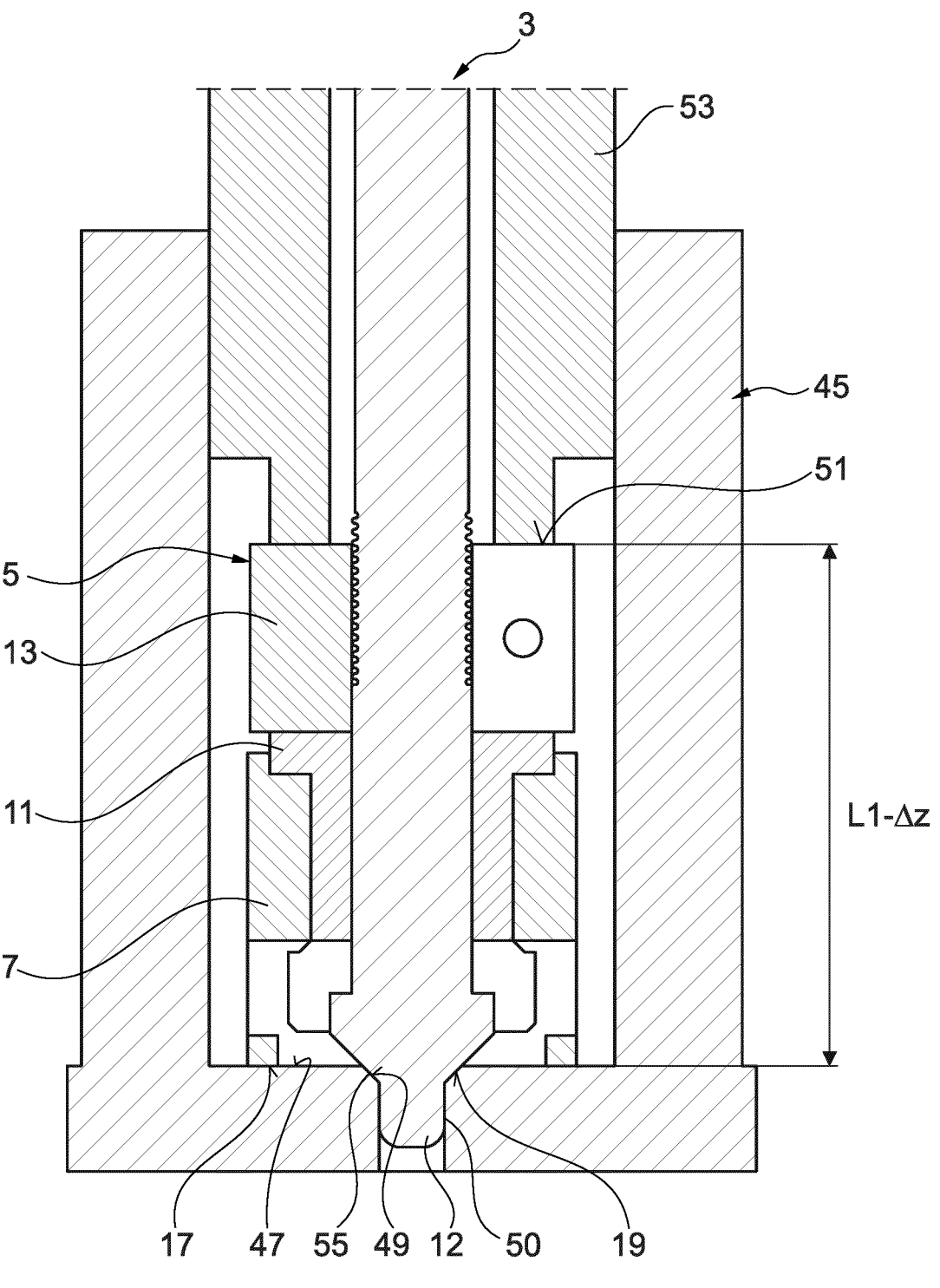
Figure 5C:
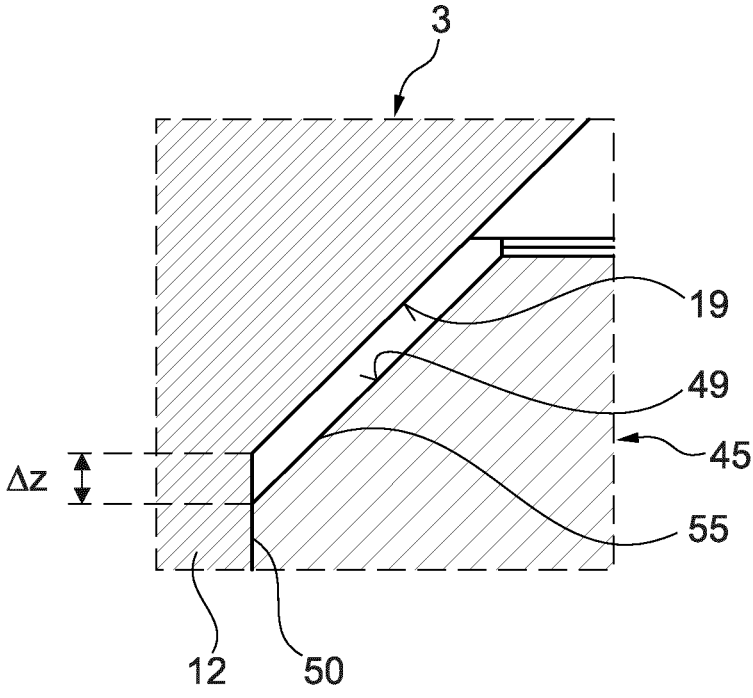

In this state, it is possible in a second step to just securely mount the mounting device 13 to the clamping region 15 of the shaft 10. Then, the working depth is defined by the axial distance of the contact surface 47 to the limit stop 49 as a maximum working depth. However, the working depth may preferably be changed in accordance with the further steps explained as follows:

As shown in FIG. 5*b* an alternative second step, a predetermined compression force is applied to the depth determination device 5 in axial direction, such that at least a part of the depth determination device 5, in particular the cutting cage 7, is elastically compressed by a certain compression amount against the contact surface 47. Under application of the compression force, the first distance is effectively shortened by the compression amount to L1-Dz, wherein Dz is the compression amount. The stop surface 17 still rests against the contact surface 47, and the cutting edge 19 still rests against the limit stop 49.

The compression force is preferably applied to the mounting device 13, in particular at the upper end 51. Preferably, the compression force is applied by a pressure screw 53, or pneumatically, or hydraulically.

Preferably, prior to applying the compression force, the compression amount Dz by which the depth determination device 5 shall be elastically compressed is defined, and the compression force is set depending on, in particular as a function of, the defined compression amount Dz.

In this compressed state, in a third step, the mounting device 13 is secured to the clamping region 15, such that the mounting device 13 is firmly mounted, in particular clamped, to the clamping region 15. Thereby, on the one hand, the tool assembly 1 is formed, and, on the other hand, the working depth is fixed.

In a fourth step, the compression force is released from the depth determination device 5. Thus, in particular the cutting cage 7 relaxes elastically into is initial extension, such that the first distance is again L1. At the same time, because the mounting device 13 is firmly secured to the tool shaft 10, the cutting edge 19 is lifted from the limit stop 49 by the compression amount Dz, as shown at c). Thus, the axial position of the stop surface 17, which still rests against the contact surface 47, and the cutting edge 19 is changed by the compression amount Dz. In this way, the working depth or cutting depth of the tool 3 is changed from the maximum working depth by the compression amount Dz.

Finally, the tool assembly 1 is removed from the depth setting device 45.

In the first embodiment of the depth setting device 45 shown in FIG. 5, the contact surface 47 is provided by the depth setting device 45 in one piece. Also, the limit stop 49 is provided by the depth setting device 45 in one piece, in particular by a depth set depression 55.

The depth setting device 45 according to the first embodiment is adapted to be used with a tool 3 which is particularly embodied as a countersinking tool.

Figure 6:
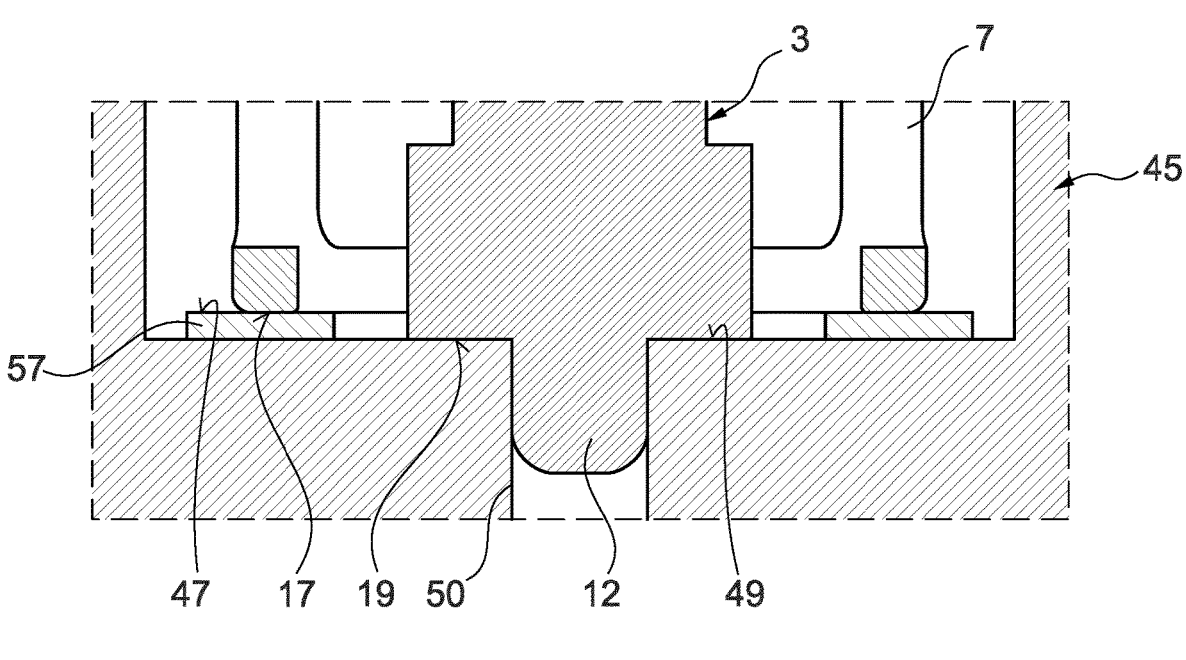
FIG. 6 shows a second embodiment of a depth setting device.

FIG. 6 shows a second embodiment of the depth setting device 45. This second embodiment particularly is adapted to be used with a tool 3 embodied as a chamfering tool or spot facing tool or deburring tool. Further, the second embodiment of the depth setting device 45 differs from the first embodiment in so far as the contact surface 47 is provided by a contact distance element 57 which is arranged on the depth setting device 45. Preferably, the contact distance element 57 is a distance ring. In this case, the limit stop 49 is not provided by a depth set depression 55. In particular, there is no depth set depression 55 in this embodiment of the depth setting device 45.

Figure 7:
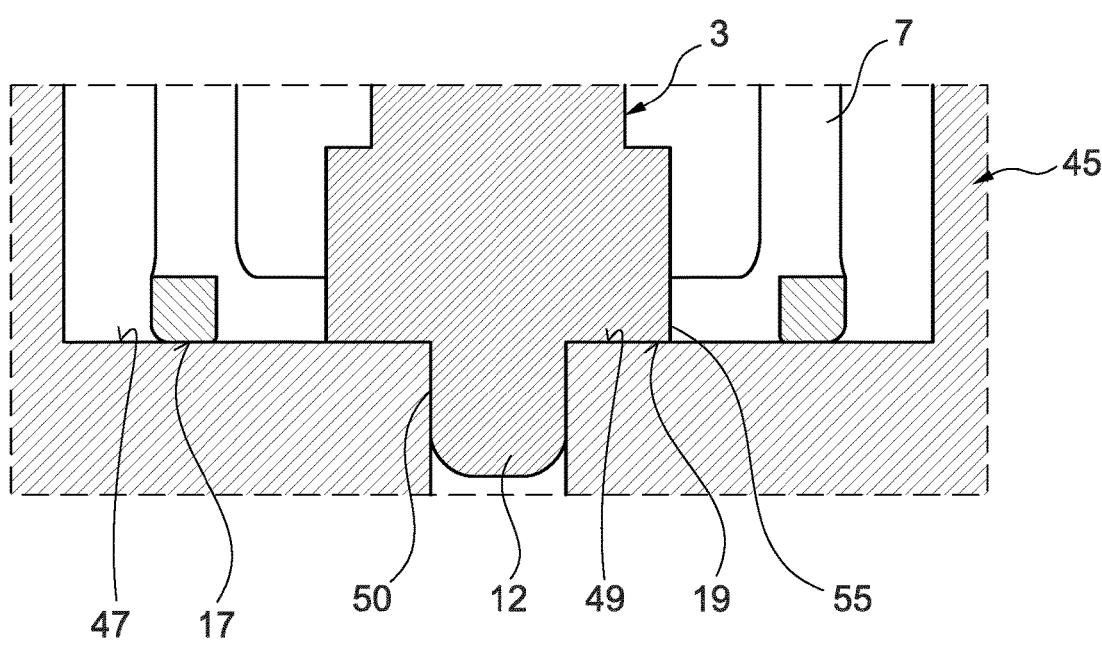
FIG. 7 shows a third embodiment of a depth setting device.

FIG. 7 shows a third embodiment of the depth setting device 45. This third embodiment is also adapted to be used with a tool 3 embodiment as a chamfering tool or spot facing tool or deburring tool. However, in this case, as in the first embodiment, the contact surface 47 is provided by the depth setting device 45 in one piece, and the limit stop 49 is provided by a depth set depression 55.

In another embodiment of the depth setting device 45, the limit stop 49 may be provided by a depth set elevation, or by a stop distance element.

Figure 8:
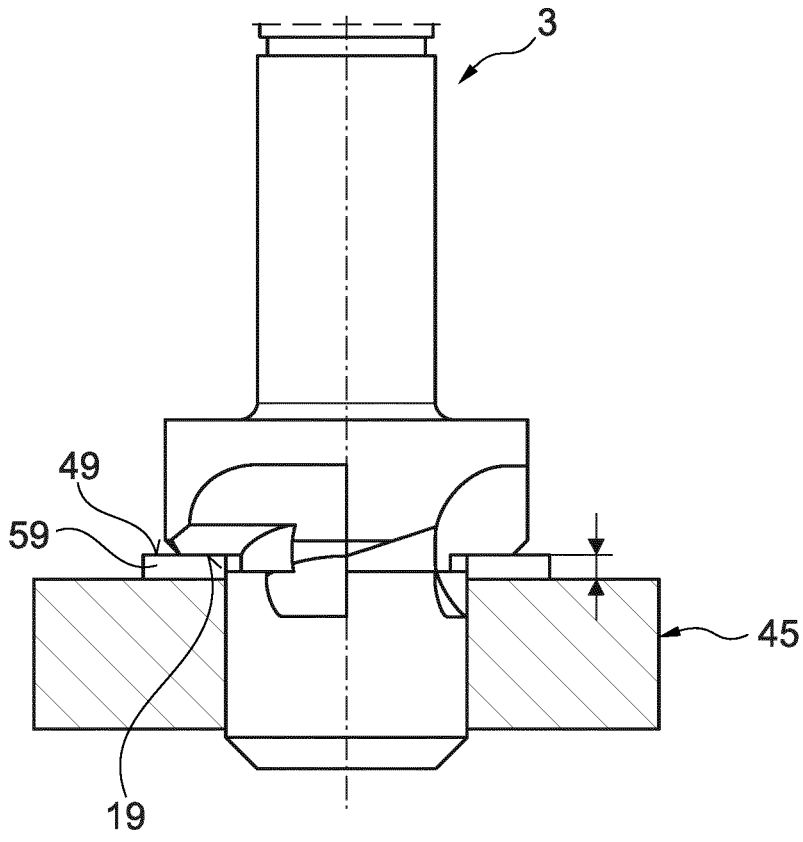
FIG. 8 shows a fourth embodiment of a depth setting device.

FIG. 8 shows a fourth embodiment of the depth setting device 45. For a simpler representation, the cutting cage 7 is omitted in FIG. 8. In this fourth embodiment, the limit stop 49 is provided by a stop distance element 59 which is arranged on the depth setting device 45.

The invention claimed is:

1. Method for determining a working depth of a tool, comprising
   a) arranging a tool and a depth determination device on a depth setting device in such a way that
      a mounting device of the depth determination device is located at least partially around a clamping region of a shaft of the tool such that the depth determination device is free to move relative to the tool in an axial direction, and
      a stop surface of the depth determination device (5) lies against a contact surface of the depth setting device, and a cutting edge of the tool lies against a limit stop (49) of the depth setting device;
   b0) applying a predetermined compression force in axial direction to the depth determination device, such that at least a part of the depth determination device is elastically compressed by a certain compression amount against the contact surface, obtaining a compressed state of the depth determination device;
   b) securing the mounting device to the clamping region of the shaft in the compressed state of the depth determination device such that the mounting device is firmly mounted to the clamping region of the shaft, whereby a tool assembly is formed;
   c0) releasing the compression force from the depth determination device, and
   c) removing the tool assembly from the depth setting device.

2. The method according to claim 1, wherein prior to applying the predetermined compression force in step b0), the compression amount by which the depth determination device shall be elastically compressed is defined, and the compression force is set as a function of the defined compression amount.

3. The method according to claim 1, wherein the contact surface is provided by the depth setting device in one piece, or by a contact distance element arranged on the depth setting device.

4. The method according to claim 1, wherein the limit stop is provided by the depth setting device in one piece, or by a stop distance element arranged on the depth setting device.

5. The method according to claim 1, wherein the compression force is at least one of applied by a pressure screw, or pneumatically, or hydraulically; and applied to the mounting device.

6. The method according to claim 1, wherein a drilling tool, a milling tool, a chamfering tool, a countersinking tool, a spot facing tool, or a deburring tool is used as the tool.

7. A tool for machining a workpiece, wherein the tool is adapted to be used in a method according to claim 1, the tool comprising a tool head having at least one cutting edge, and a shaft, wherein the shaft comprises a clamping region with a friction enhanced surface.

8. The tool according to claim 7, wherein the friction enhanced surface comprises a plurality of depressions or a knurled surface.

9. The tool according to claim 8, wherein the plurality of depressions includes a plurality of circumferential grooves.

10. The tool according to claim 7, wherein the tool head comprises an insertion pin for guiding the tool in a depression of a workpiece to be machined by the tool.

11. The tool according to claim 7, wherein the tool is at least one of a drilling tool, a milling tool, a chamfering tool, a countersinking tool, a spot facing tool, and a deburring tool.

12. The tool according to claim 7, wherein the tool is adapted to cooperate with a depth determination device.

13. A depth determination device, comprising a cutting cage adapted to at least partially enclose a tool head of a tool according to claim 7;

a circumferential bearing device arranged at least partially in the cutting cage and adapted to allow for a relative rotational movement between the cutting cage and the tool, and a mounting device, adapted to be firmly mounted to the tool in a clamping region of the tool, wherein the cutting cage has a stop surface adapted to determine a cutting depth of the tool when the depth determination device is attached to the tool.

14. The depth determination device according to claim 13, further comprising an axial bearing device arranged between the cutting cage and the mounting device and adapted to allow for a relative rotational movement between the cutting cage and the mounting device.

15. The depth determination device according to claim 14, wherein the circumferential bearing device is a slide bearing, in particular a bearing sleeve, and/or the axial bearing device is a roller bearing, in particular an axial ball bearing, or a slide bearing.

16. The depth determination device according to claim 13, wherein the mounting device comprises a clamping ring.

17. The depth determination device according to claim 13, wherein the depth determination device has no adjusting device for adjusting an axial distance between the stop surface and a cutting edge of the tool.

18. The depth determination device according to claim 13, wherein the cutting cage has a plurality of radial chip openings.

19. A tool assembly, comprising:

a tool configured to be used in the method according to claim 1, comprising:

a tool head having at least one cutting edge, and a shaft, wherein the shaft comprises a clamping region with a friction enhanced surface; and a depth determination device, comprising:

a cutting cage adapted to at least partially enclose the tool head, a circumferential bearing device arranged at least partially in the cutting cage and adapted to allow for a relative rotational movement between the cutting cage and the tool, and a mounting device, adapted to be firmly mounted to the tool in a clamping region of the tool, wherein the cutting cage has a stop surface adapted to determine a cutting depth of the tool when the depth determination device is attached to the tool, wherein the mounting device is firmly secured to the clamping region of the tool.

20. The tool assembly according to claim 19, wherein the tool assembly is adapted to be coupled to a handheld tool drive.

21. The method for using the tool assembly according to claim 19, wherein the tool assembly is used to machine a surface of an aircraft.

* * * * *